US009495473B2

(12) United States Patent
Gardner et al.

(10) Patent No.: US 9,495,473 B2
(45) Date of Patent: Nov. 15, 2016

(54) ANALYTIC DASHBOARD WITH USER INTERFACE FOR PRODUCING A SINGLE CHART STATISTICAL CORRELATION FROM SOURCE AND TARGET CHARTS DURING A LOAD TEST

(75) Inventors: Kenneth C. Gardner, Palo Alto, CA (US); Tal Broda, Sunnyvale, CA (US); Kendall Cosby, Aurora, CA (US); Darrell Esau, Santa Clara, CA (US); Michael Hemmert, Scotts Valley, CA (US)

(73) Assignee: SOASTA, Inc., Mountain View, CA (US)

( * ) Notice: Subject to any disclaimer, the term of this patent is extended or adjusted under 35 U.S.C. 154(b) by 214 days.

(21) Appl. No.: 12/927,600

(22) Filed: Nov. 18, 2010

(65) Prior Publication Data
US 2012/0017165 A1    Jan. 19, 2012

Related U.S. Application Data

(63) Continuation-in-part of application No. 12/804,338, filed on Jul. 19, 2010, now Pat. No. 9,436,579.

(51) Int. Cl.
| | |
|---|---|
| *G06F 11/30* | (2006.01) |
| *G06F 15/00* | (2006.01) |
| *G06F 3/048* | (2013.01) |
| *G06F 17/30* | (2006.01) |
| *H04L 12/24* | (2006.01) |
| *H04L 29/08* | (2006.01) |
| *G06F 11/34* | (2006.01) |

(52) U.S. Cl.
CPC ......... *G06F 17/30899* (2013.01); *H04L 41/22* (2013.01); *H04L 67/36* (2013.01); *G06F 11/3409* (2013.01); *G06F 11/3495* (2013.01); *G06F 2201/875* (2013.01)

(58) Field of Classification Search
CPC ......... G06F 3/048; G06F 11/30; G06F 15/00
USPC ......................................................... 715/736
See application file for complete search history.

(56) References Cited

U.S. PATENT DOCUMENTS

| | | |
|---|---|---|
| 5,414,809 A | 5/1995 | Hogan et al. |
| 5,615,347 A | 3/1997 | Davis et al. |

(Continued)

OTHER PUBLICATIONS

Mercury Interactive Corporation, LoadRunner Analysis User's Guide Version 7.6, Dec. 10, 2005, pp. 1-608.*

(Continued)

*Primary Examiner* — Jennifer To
*Assistant Examiner* — Hugo Molina
(74) *Attorney, Agent, or Firm* — The Law Offices of Bradley J. Bereznak

(57) ABSTRACT

A processor-implemented method includes providing an analytic dashboard with a graphical user interface (GUI) that outputs aggregated results streaming in real-time of a load test performed on a target website. Responsive to input of a user on the GUI, the input comprising selection of a source chart and a target chart, a single chart is automatically generated that represents either a combination or a statistical correlation of the source and target charts. The single chart has a left y-axis and an x-axis. The combination or the statistical correlation of the single chart changing in real-time as the load test progresses. A visual representation of the single chart is then produced on the analytic dashboard.

23 Claims, 11 Drawing Sheets

(56) References Cited

U.S. PATENT DOCUMENTS

| | | | |
|---|---|---|---|
| 5,724,525 A | 3/1998 | Beyers et al. | |
| 5,945,986 A | 8/1999 | Bargar et al. | |
| 6,025,853 A | 2/2000 | Baldwin | |
| 6,092,043 A | 7/2000 | Squires et al. | |
| 6,134,582 A | 10/2000 | Kennedy | |
| 6,317,786 B1* | 11/2001 | Yamane et al. | 709/224 |
| 6,434,513 B1 | 8/2002 | Sherman et al. | |
| 6,477,483 B1* | 11/2002 | Scarlat et al. | 702/186 |
| 6,542,163 B2 | 4/2003 | Gorbet et al. | |
| 6,560,564 B2* | 5/2003 | Scarlat et al. | 702/186 |
| 6,563,523 B1 | 5/2003 | Suchocki et al. | |
| 6,601,020 B1 | 7/2003 | Myers | |
| 6,738,933 B2* | 5/2004 | Fraenkel et al. | 714/47.2 |
| 6,792,393 B1* | 9/2004 | Farel et al. | 702/186 |
| 6,817,010 B2 | 11/2004 | Aizenbud-Reshef et al. | |
| 6,898,556 B2* | 5/2005 | Smocha et al. | 702/186 |
| 6,959,013 B1 | 10/2005 | Muller et al. | |
| 6,975,963 B2 | 12/2005 | Hamilton et al. | |
| 7,050,056 B2 | 5/2006 | Meyringer | |
| 7,133,805 B1* | 11/2006 | Dankenbring et al. | 702/186 |
| 7,216,168 B2 | 5/2007 | Merriam | |
| 7,334,162 B1 | 2/2008 | Vakrat et al. | |
| 7,376,902 B2 | 5/2008 | Lueckhoff | |
| 7,464,121 B2 | 12/2008 | Barcia et al. | |
| 7,478,035 B1 | 1/2009 | Wrench et al. | |
| 7,548,875 B2 | 6/2009 | Mikkelsen et al. | |
| 7,587,638 B2 | 9/2009 | Shah et al. | |
| 7,594,238 B2 | 9/2009 | Takahashi | |
| 7,607,169 B1 | 10/2009 | Njemanze et al. | |
| 7,617,201 B1* | 11/2009 | Bedell et al. | |
| 7,630,862 B2 | 12/2009 | Glas et al. | |
| 7,685,234 B2 | 3/2010 | Gottfried | |
| 7,689,455 B2 | 3/2010 | Fligler et al. | |
| 7,693,947 B2 | 4/2010 | Judge et al. | |
| 7,725,812 B1 | 5/2010 | Balkus et al. | |
| 7,743,128 B2 | 6/2010 | Mullarkey | |
| 7,757,175 B2 | 7/2010 | Miller | |
| 7,844,036 B2 | 11/2010 | Gardner et al. | |
| RE42,153 E * | 2/2011 | Hubbard et al. | 709/203 |
| 7,965,643 B1 | 6/2011 | Gilbert et al. | |
| 8,015,327 B1* | 9/2011 | Zahavi et al. | 710/52 |
| 8,166,458 B2 | 4/2012 | Li et al. | |
| 8,269,773 B2* | 9/2012 | Gregg, III | G06T 11/206 345/440 |
| 8,291,079 B1 | 10/2012 | Colton et al. | |
| 8,306,195 B2 | 11/2012 | Gardner et al. | |
| 8,341,462 B2 | 12/2012 | Broda et al. | |
| 8,448,148 B1* | 5/2013 | Kolawa et al. | 717/134 |
| 8,464,224 B2 | 6/2013 | Dulip et al. | |
| 8,479,122 B2 | 7/2013 | Hotelling et al. | |
| 8,510,600 B2 | 8/2013 | Gardner et al. | |
| 8,583,777 B1 | 11/2013 | Boyle et al. | |
| 9,021,362 B2 | 4/2015 | Broda et al. | |
| 9,154,611 B1 | 10/2015 | Jackson et al. | |
| 9,229,842 B2 | 1/2016 | Broda et al. | |
| 9,251,035 B1 | 2/2016 | Vazac et al. | |
| 2002/0138226 A1 | 9/2002 | Doane | |
| 2002/0147937 A1 | 10/2002 | Wolf | |
| 2003/0074161 A1* | 4/2003 | Smocha | G06F 11/3409 702/186 |
| 2003/0074606 A1 | 4/2003 | Boker | |
| 2003/0109951 A1* | 6/2003 | Hsiung et al. | 700/108 |
| 2003/0195960 A1 | 10/2003 | Merriam | |
| 2004/0010584 A1 | 1/2004 | Peterson et al. | |
| 2004/0039550 A1 | 2/2004 | Myers | |
| 2004/0059544 A1 | 3/2004 | Smocha et al. | |
| 2004/0064293 A1 | 4/2004 | Hamilton et al. | |
| 2004/0119713 A1 | 6/2004 | Meyringer | |
| 2004/0123320 A1 | 6/2004 | Daily et al. | |
| 2004/0205724 A1 | 10/2004 | Mayberry | |
| 2005/0027858 A1 | 2/2005 | Sloth et al. | |
| 2005/0102318 A1 | 5/2005 | Odhner et al. | |
| 2005/0182589 A1 | 8/2005 | Smocha et al. | |
| 2005/0216234 A1 | 9/2005 | Glas et al. | |
| 2005/0278458 A1 | 12/2005 | Berger et al. | |
| 2006/0031209 A1* | 2/2006 | Ahlberg et al. | 707/3 |
| 2006/0075094 A1* | 4/2006 | Wen et al. | 709/224 |
| 2006/0229931 A1 | 10/2006 | Fligler et al. | |
| 2006/0271700 A1 | 11/2006 | Kawai et al. | |
| 2007/0130113 A1* | 6/2007 | Ting | G06F 17/30554 |
| 2007/0143306 A1 | 6/2007 | Yang | |
| 2007/0232237 A1 | 10/2007 | Croak et al. | |
| 2007/0282567 A1 | 12/2007 | Dawson et al. | |
| 2007/0283282 A1 | 12/2007 | Bonfiglio et al. | |
| 2007/0288205 A1 | 12/2007 | Vazquez et al. | |
| 2008/0059947 A1 | 3/2008 | Anand et al. | |
| 2008/0066009 A1 | 3/2008 | Gardner et al. | |
| 2008/0140347 A1 | 6/2008 | Ramsey et al. | |
| 2008/0147462 A1* | 6/2008 | Muller | 705/7 |
| 2008/0189408 A1 | 8/2008 | Cancel et al. | |
| 2009/0077107 A1 | 3/2009 | Scumniotales et al. | |
| 2009/0271152 A1 | 10/2009 | Barrett | |
| 2009/0300423 A1 | 12/2009 | Ferris | |
| 2010/0023867 A1 | 1/2010 | Coldiron et al. | |
| 2010/0057935 A1 | 3/2010 | Kawai et al. | |
| 2010/0115496 A1 | 5/2010 | Amichai | |
| 2010/0198960 A1 | 8/2010 | Kirschnick et al. | |
| 2010/0250732 A1 | 9/2010 | Bucknell | |
| 2010/0251128 A1* | 9/2010 | Cordasco | G06F 11/3409 715/736 |
| 2010/0333072 A1* | 12/2010 | Dulip et al. | 717/128 |
| 2011/0066892 A1 | 3/2011 | Gardner et al. | |
| 2011/0119370 A1 | 5/2011 | Huang et al. | |
| 2011/0130205 A1 | 6/2011 | Cho et al. | |
| 2011/0202517 A1 | 8/2011 | Reddy et al. | |
| 2011/0282642 A1 | 11/2011 | Kruger et al. | |
| 2012/0017165 A1 | 1/2012 | Gardner et al. | |
| 2012/0017210 A1 | 1/2012 | Huggins et al. | |
| 2012/0023429 A1* | 1/2012 | Medhi | 715/772 |
| 2012/0101799 A1 | 4/2012 | Fernandes | |
| 2012/0166634 A1 | 6/2012 | Baumback et al. | |
| 2012/0246310 A1 | 9/2012 | Broda et al. | |
| 2012/0314616 A1 | 12/2012 | Hong et al. | |
| 2013/0031449 A1 | 1/2013 | Griffiths et al. | |
| 2013/0097307 A1 | 4/2013 | Vazac et al. | |
| 2013/0116976 A1 | 5/2013 | Kanemasa et al. | |
| 2014/0033055 A1 | 1/2014 | Gardner et al. | |
| 2014/0189320 A1 | 7/2014 | Kuo | |
| 2014/0280880 A1 | 9/2014 | Tellis et al. | |
| 2015/0067527 A1 | 3/2015 | Gardner et al. | |

OTHER PUBLICATIONS

Chester et al., "Mastering Excel 97", 1994, Sybex, 4th Ed., pp. 1016, 136-137, 430, 911, 957-958.

Malan et al. "An Extensible Probe Architecture for Network Protocol Performance Measurement", IEEE, Oct. 1998, pp. 215-227.

Jamin et al. "A Measurement-Based Admission Control Algorithm for Integrated Service Packet Networks", IEEE, 1997, pp. 56-70.

Dillenseger, "CLIF, a framework based on Fractal for flexible, distributed load testing" Nov. 18, 2008, Ann. Telecommun., 64:101-120.

* cited by examiner

ANALYTIC DASHBOARD WITH USER INTERFACE FOR PRODUCING A SINGLE CHART STATISTICAL CORRELATION FROM SOURCE AND TARGET CHARTS DURING A LOAD TEST

RELATED APPLICATIONS

This application is a continuation-in-part (CIP) application of Ser. No. 12/804,338 filed Jul. 19, 2010 entitled, "REAL-TIME, MULTI-TIER, LOAD TEST RESULTS DATA", which is assigned to the assignee of the present CIP application.

TECHNICAL FIELD

The present disclosure relates generally to methods and apparatus for processing data generated from load testing of websites or browser-based applications. Still more particularly, the present disclosure relates to methods, apparatus and executable computer instructions for combining and correlating test results data.

BACKGROUND

Information technology is now routinely used by many enterprises to receive, process, and provide information via widely accessible electronic communications networks, such as the Internet. Yet most information technology systems will begin to deny service, or fail to process message traffic efficiently, when communications traffic exceeds a processing capacity of the system. Such failures in communication can significantly impair the operations of an enterprise in many ways. Slower website performance is also known to cause users/visitors to leave the website sooner. Another consequence of poor performance is that the website may be downgraded in search engine results rankings.

In recent years, enterprises and developers have sought an easy and affordable way to use cloud computing as a way to load and performance test their web-based applications. Cloud computing gets its name from the fact that the machine, storage, and application resources exist on a "cloud" of servers. In cloud computing shared resources, software and information are provided on-demand, like a public utility, via the Internet. Cloud computing is closely related to grid computing, which refers to the concept of interconnecting networked computers such that processing power, memory and data storage are all community resources that authorized users can utilize for specific tasks.

Load testing a web-based application or website can involve simulating a very large number (e.g., up to or beyond 1,000,000) of virtual website users via Hypertext Transfer Protocol (HTTP) or HTTP Secure (HTTPS) message intercommunications with the target website. For very large tests, sending and aggregating the test results data generated from all of the load servers to a database available to a dashboard in real-time has been problematic. The huge overhead of receiving and processing a very large number of HTTP messages containing all of the requests and responses sent from each of the many load servers to the analytic servers responsible for analyzing the test results data can easily overwhelm the resources of the server. In addition, the creation of test results charts that combine data from two or more charts into a single, multi-axis chart, or correlate two datasets, for display on a dashboard has been difficult. In the past, presenting business intelligence test results data in combined or correlated charts involved complex, time-consuming and lengthy processing steps requiring considerable manual input.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

Figure 1:
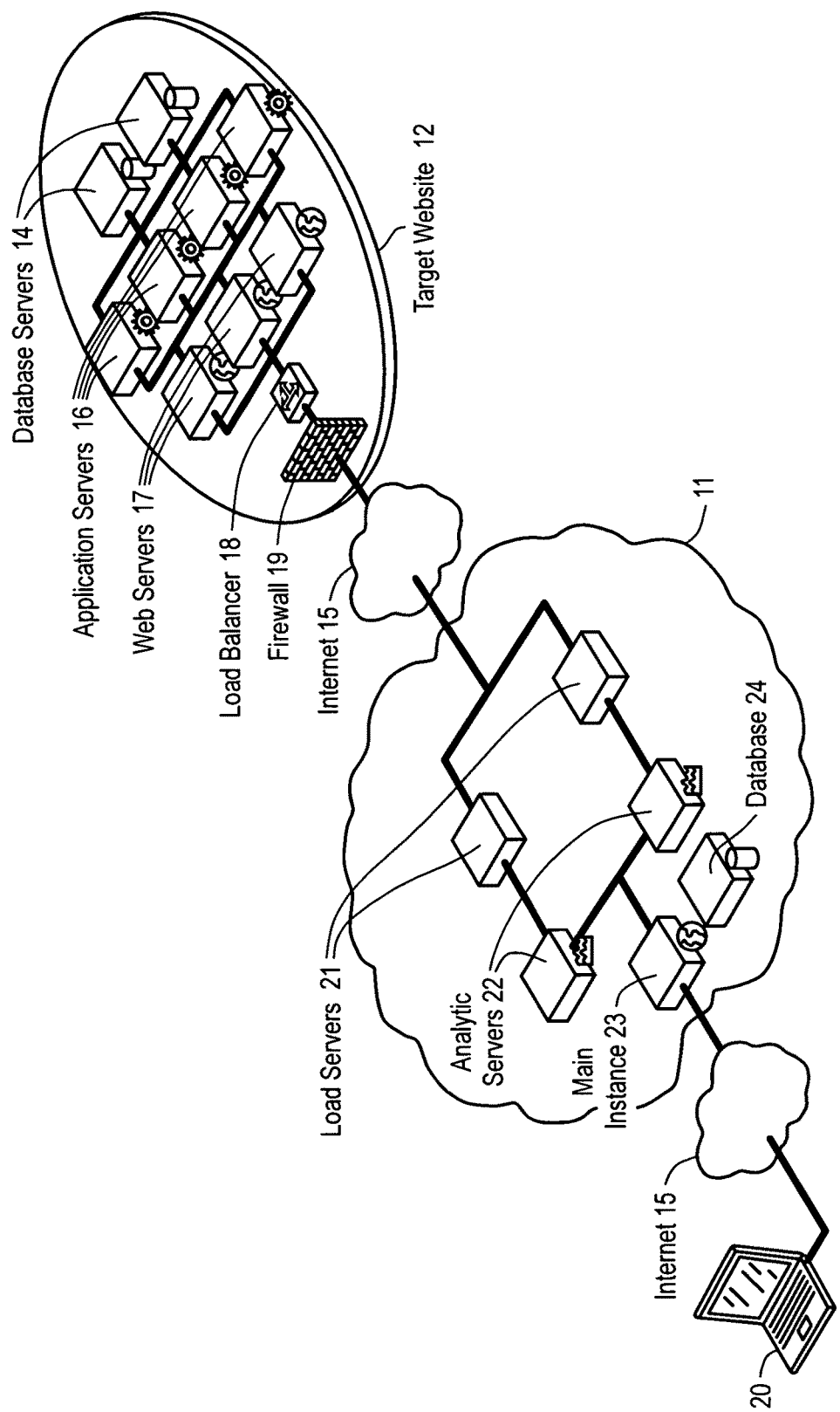
FIG. 1 illustrates an example high level architectural diagram of one stage of a CloudTest® provisioning process.

In the following description specific details are set forth, such as server types, cloud providers, structural features, process steps, etc., in order to provide a thorough understanding of the subject matter disclosed herein. However, persons having ordinary skill in the relevant arts will appreciate that these specific details may not be needed to practice the present invention. It should also be understood that the elements in the FIGS. are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. A "public cloud" refers to a cloud that is publicly available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers.

Cloud platform services or "Platform as a Service (PaaS)" deliver a computing platform and/or solution stack as a service. An example PaaS cloud provider is the Google App Engine, which lets anyone build applications on Google's scalable infrastructure. Another leading software platform in the cloud provider is Microsoft Azure™, an application platform in the cloud that allows applications to be hosted and run at Microsoft datacenters.

A "private cloud" is a cloud that is not generally available to the public, and which is typically located behind a firewall of a business. Thus, a private cloud is only available as a platform for users of that business who are behind the firewall.

The term "server" broadly refers to any combination of hardware or software embodied in a computer (i.e., a machine "instance") designed to provide services to client devices or processes. A server therefore can refer to a computer that runs a server operating system from computer-executable code stored in a memory, and which is provided to the user as virtualized or non-virtualized server; it can also refer to any software or dedicated hardware capable of providing computing services.

In the context of the present disclosure, "load" servers (also referred to as "Maestro" or "test" servers) are servers deployed and utilized primarily to generate a test load on a target website. That is, load servers play the test composition, generating a load on a target (customer) website and web applications. Load servers also function to report back results of the load test and statistics in real-time. "Analytic" or "result" servers are deployed and utilized primarily to collect the real-time test results from the load servers, aggregate those results, stream the results to real-time dashboards, and store them in a database.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly simultaneously, i.e., within milliseconds or seconds.

A "grid" or "test grid" refers to a collection of interconnected load servers and result servers that may be used to run a load test on a target website or web applications. As disclosed herein, a computer program or grid wizard may be utilized to automatically determine the global, cross-cloud, resources needed to execute a test by examining the test plan or script (also referred to as a test composition). Furthermore, the computer program can automatically allocate those server resources required for the test across multiple different cloud providers; verifies that the allocated servers are operational; and that the allocated servers are running proprietary load testing software or computer program product correctly. The computer program or product also monitors the allocated servers, replacing non-operational servers (when allocated, and during execution of the test) and displays results from multiple globally distributed clouds in a real-time streaming dashboard, which requires no user initiated refresh.

In one embodiment, a graphical user interface (GUI) is provided that allows a user to selectively combine or correlate two or more charts representing different datasets into a single chart (i.e., create a single multi-axis chart from two or more different charts). In one example, a user may select (e.g., "click" using a mouse, touchpad, or other input device) on one chart (or icon representing a chart) displayed visually on a screen, drag the chart across the display screen, and then drop the chart on another chart (e.g., by the user releasing a button on the mouse). In response to the selected chart being dropped on another chart, a visual representation of the two combined/correlated charts is automatically generated on the display. In a specific implementation, the "drag and drop" capability of the user interface provides a user with the ability to combine/correlate test results data with other test results data (e.g., count of virtual users with average response time); test results data with monitor data (e.g., count of virtual users with server CPU usage); and monitor data with other monitor data (e.g., Java Virtual Memory (JVM) heap usage with CPU usage). Thus, a user of a business intelligence system can quickly combine/correlate test data results taken from different metrics or datasets along a common timeline to analyze how a website or other system reacts in real-time.

In one embodiment, instead of using complex and time-consuming wizards with drop-downs, checkboxes, etc., to build the combined or correlated chart from scratch, the disclosed GUI automatically combines or correlates two charts into a single chart having a left y-axis, a right y-axis, and a common x-axis. For a correlated chart, the GUI produces a new chart that shows how the data of the initially selected chart (referred to in the present disclosure as the source chart) is statistically correlated to that of the target chart (the chart that the user drags and drops onto). This is automatically performed by a computer-implemented process that matches each point from both charts based on a common x-axis unit-type, e.g., time, and then plots each pair of values on a new axis system that has the source chart's y-axis and the target chart's x-axis.

For combined charts, the target chart keeps both its x-axis and its y-axis (the y-axis may appear on the left-side), and a new y-axis (right-side) is created for the source chart. One or more additional charts may be dropped on the newly combined chart, as long as the source chart has a y-axis that matches, in unit-type, either the left or right y-axis of the combined chart.

In one embodiment, as the user drags the source chart drag handle around the dashboard, when a chart cannot be combined or correlated with a drop target chart that the drag handle is positioned or hovering above, a "Stop" icon appears on the display. On the other hand, when a chart can be combined or correlated, a "Drop" icon appears on the display screen of the user.

FIG. 1 illustrates an example high level architectural diagram of one stage of a CloudTest® provisioning process, which is the name given to the application program or grid wizard program utilized to load test a target website 12. As shown, target website 12 includes a plurality of web servers 17 coupled to Internet cloud 15 through a load balancer 18 and a firewall 19. Web servers 17 are interconnected with a plurality of application servers 16 and a plurality of database servers 14.

Target website 12 is shown connected to a public cloud 11 via Internet cloud 15a. Public cloud 11 includes a main instance 23 coupled to a database 24. Database 24 may be used to store test results, store metadata indicative of the test definition, and to store monitoring data (e.g., CPU metrics) generated during the load test. Main instance 23 is also shown coupled to a pair of analytic servers 22 and a pair of load servers 21 within cloud 11, consistent with a snapshot view of the start of a process of deploying a test grid. It is appreciated that cloud 11 may comprise multiple clouds associated with multiple different cloud providers. In the example shown, main instance 23 is a virtual machine deployed on a server provided in cloud 11 that communicates with a browser application. In one embodiment, main instance 23 may include a results service (designated as a "reader" results service, as opposed to all of the other remote, "writer" results services) which reads data from database 24 and serves it to a web application, which in turn formats the data and serves it to an analytic dashboard in the browser. In operation, main instance 23 executes the coded sequence of computer executed steps (e.g., from code stored in a memory) that allocates the server resources required for the test across one or multiple different cloud providers. The same application that allocates/verifies server resources may also verify that the allocated servers are operational to conduct the website load test. The main instance may also execute code that aggregates load test results.

Additionally, main instance 23 may also execute code that generates the GUI described herein that allows a user to automatically combine or correlate chart data simply by dragging one chart (source) over another chart (target) and dropping it at that position on the screen.

Connected to the front-end of cloud 11 through Internet cloud 15 is a laptop computer 20 associated with a user who may orchestrate deployment of the test of target website 12. It is appreciated that in other implementations, computer 20 may comprise a desktop computer, workstation, or other computing device that provides a graphical user interface that allows a user to create and execute the test composition, define the parameters of the grid, initiate the load test, as well as analyze/review results of the test in real-time. This GUI provides the ability to combine two or more charts into 1, creating a single multi-axis chart, or correlating two datasets by simply dragging a source chart and dropping it on the target chart. The GUI may be web-based so it can be accessed from any computer having web-browser capabilities from any location in the world, without installation of specialized software.

Persons of skill in the art will understand that the software which implements main instance 23 may also be downloaded to the user's laptop computer 20 or implemented on a separate hardware appliance unit located either at the user's premises (e.g., behind the firewall) or anywhere in clouds 15 or 11. It is further appreciated that laptop 20 is representative of a wide variety of computer devices, such as workstations, personal computers, distributed computer systems, etc., that may be utilized by the user to launch the method for provisioning/running the cross-CloudTest grid, analyzing streaming real-time results, as well as monitoring the performance of the actual load test. In other words, the GUI described herein may also run on a computer or data processing system local to the user.

Continuing with the example of FIG. 1, the application program running on main instance 23 operates to create a GUI that allows a user of laptop 20 to remotely interact with the application, view/monitor the test results in real-time, and modify parameters/test conditions dynamically during the actual test. (For purposes of the present disclosure, the grid wizard is considered synonymous with the application program or system program that performs the method and operations described herein.) In one embodiment, main instance 23 may include an embedded load server for running a relatively small load test that does not require the deployment of other load servers, and an embedded results (i.e., analytic) server for collecting/aggregating the real-time test results. In another embodiment, the main instance and the database provide a basic CloudTest environment that can be used to launch/establish one or more grids, with more or more cloud providers being utilized to provision each grid.

The overall testing process begins with the user creating a sophisticated test plan or composition via a GUI of either the same application program running on main instance 23 or a GUI associated with another web browser application. The GUI may be utilized that generate complex parallel message streams for website testing. In one example, the test plan may be created in the form of a visual message composition (analogous to a music composition) for testing and demonstrating web services, such as that described in U.S. patent application Ser. No. 11/503,580, filed Aug. 14, 2006, which application is herein incorporated by reference.

The process of deploying the test grid for a large-scale test may start with the user of laptop 20 indicating to main instance 23 the number of virtual users wanted on each track of the test composition. For example, the user of the system may wish test the target website with a load equal to 1000 users on each track of a test composition. The user may indicate the number of virtual users through an input entered on a browser page of the GUI (as described below), or, alternatively, invoke a grid wizard that automatically makes an intelligent allocation of the proper amount of resources needed to conduct the test, based on examining the composition that this grid will be running. By way of example, the system may determine that a single load server should be allocated to accommodate every 1000 virtual users.

Similarly, the system (via a grid wizard) may determine a proper allocation of result servers needed to accommodate the number of load servers specified. In one implementation, users can specify how many load servers and how many result servers they want in each cloud and region. Alternatively, users may employ the grid wizard to specify all parameters. That is, users can simply specify a defined test composition, and the grid wizard automatically analyzes the composition and determines how many servers they need in each cloud and region. It is appreciated that the determination of the number of load servers and result servers is typically made based on considerations that ensure each virtual user has a satisfactory amount of bandwidth, CPU & memory resources, etc., such that it correctly simulates or behaves as a real-world browser.

Once the test has been defined and the parameters set (e.g., number of servers, server locations, etc.) via the grid wizard, upon user input, the user main instance 23 starts the process of actually deploying and allocating the specified resources by interacting with an application programming interface (API) of one or more cloud providers. By way of example, a user may click on a "Deploy Instances" button provided in a page of the CloudTest program GUI; in response, the system software contacts all of the different cloud APIs it needs and starts to allocate the required servers.

For example, if 1000 servers are to be allocated in EC2 there may be 40 simultaneous requests issued, each request being for 25 servers. If another 200 servers need to be allocated in Microsoft Azure in two different geographically-located data centers, two simultaneous requests may be issued, each for 100 servers in each data center (due to the fact that Azure does not support allocating smaller groups into one single deployment). In other words, the user may simply click on an icon button of a GUI to initiate the deployment/allocation of resources (e.g., machine instances) needed to execute the test composition, with the requests necessary to achieve that allocation being issued/handled in an automated manner, i.e., without user intervention.

FIG. 1 show the beginning of this process, wherein a first pair of load servers 21 and analytic servers 22 (also referred to as result servers or results services) have already been allocated and deployed on the grid.

Figure 2:
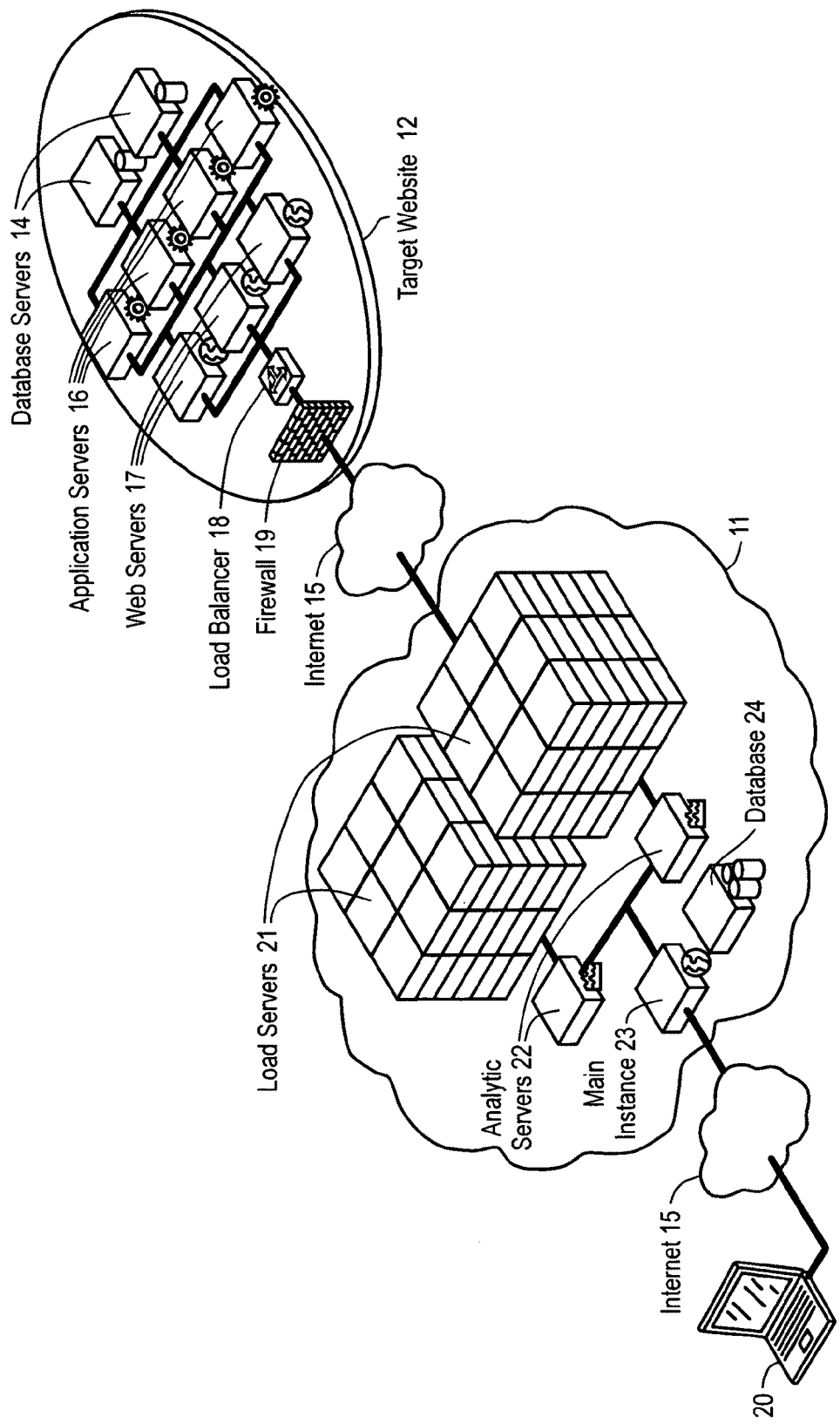
FIG. 2 illustrates an example high level architectural diagram of another stage of a CloudTest® provisioning process after the cross-cloud grid has been fully allocated and checked.

FIG. 2 illustrates an example high level architectural diagram of a later stage of a CloudTest test grid provisioning process, which may be after the cross-cloud grid has been fully allocated and checked. For reasons of clarity, an array of just fifty-four interconnected load servers 21 are shown allocated per each result server 22 in the example of FIG. 2. It is appreciated, however, that the system and method described herein is highly scalable and capable of deploying/allocating a massive amount of resources including hundreds or thousands of load servers as well as a corresponding portion or ratio of result servers, depending on the parameters specified by either the user or system prior to deployment of the grid. By way of example, a typical ratio of analytic (result) servers to load (maestro) servers is 1:50. As discussed previously, a grid—whether cross-cloud or single cloud—is a collection of load servers 21 and result servers 22, all of which (or a subset of) can be used to run a load test in concert.

Figure 3:
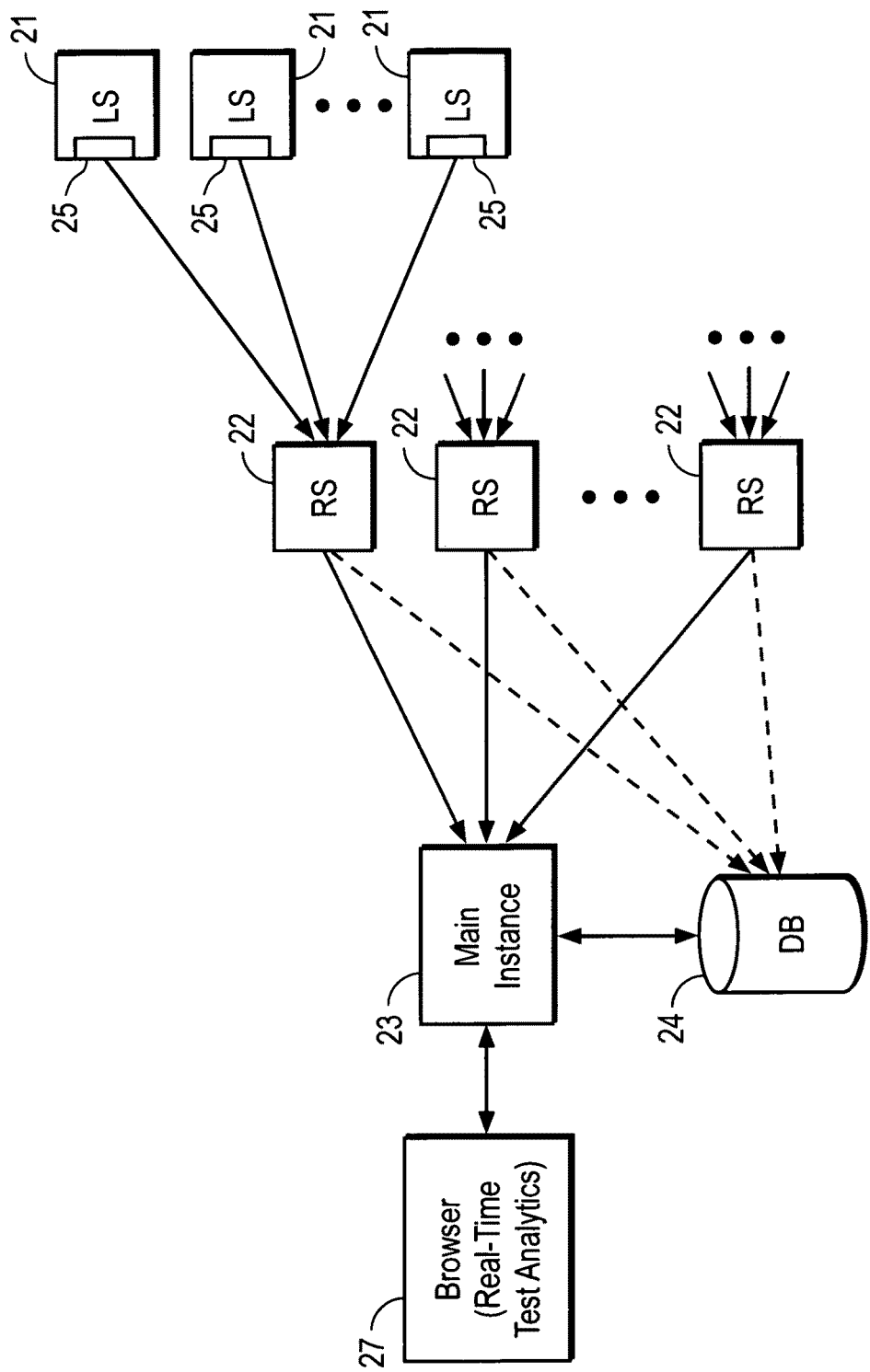
FIG. 3 is an example block high level architectural diagram that illustrates how, in real-time, load test results are aggregated at multiple different tiers or levels.

FIG. 3 is an example block high level architectural diagram that illustrates how, in real-time, load test results are aggregated at multiple different tiers or levels. As shown, block 27 represents a browser that provides real-time test analytics to a user (e.g., via laptop 20 shown in FIG. 1, or other computer device). Browser 27 is shown connected with main instance 23, which, in turn, is coupled with database 24. Database 24 provides system-level storage for aggregated test result data received from the Results Service servers 22. Database 24 receives aggregated test result data via a direct connection to each of the plurality of result servers 22.

Each of result servers 22 is connected to a plurality of associated load (Maestro) servers 21. Each load server 21 is shown having an embedded component or Result Service client 25, which computes metrics or statistics from the raw data (e.g., web pages) received from the target website or application. As discussed previously, the function of each load server 21 is to provide a load to the target website by creating one or more virtual users that access information on the target website. Within each Maestro server 21 is Result Service client 25 which functions to compute statistics such as average response time, average response size, and the like. In one embodiment, instead of sending all of the raw data received from the target website, Result Service client 25 computes relevant statistics and discards the data. Then, once an interval (e.g., every five seconds) the statistics computed by client 25 are sent to the associated result server 22.

Each of the result servers takes all of the statistics received from all of its associated load servers 21 and further aggregates those statistics. In other words, each result server 22 aggregates the aggregated results received from all of the load servers 21 that it is connected to. The resulting aggregated data is then further aggregated when querying database 24. Thus, statistics such as average response time across all of load servers 21 for the load test is stored in database 24 and available on a real-time basis to browser 27, via database queries performed by the main instance 23, which can perform further aggregation, grouping, filtering, etc.

Practitioners in the art will appreciate that aggregating statistical results data on multiple levels, beginning at the point closest to the actual load test results' creation, allows a user to view results in real-time on an analytic dashboard GUI, thereby permitting real-time analysis across the entire testing infrastructure.

In a specific implementation, each load server 21 includes a Result Service client 25, which in turn includes accumulators that stores the statistically aggregated data (e.g., average response time) computed on a second-by-second basis. Periodically (e.g., every 5 seconds), each Result Service client 25 sends an appropriate number of messages (e.g., 5 messages, one for each second) to its associated result server 22. That is, one batched message is sent every 5 seconds—the batched message including data about all of the previous 5 seconds. Each message contains the data metrics computed every one second interval. These fine granularity metrics are then further aggregated in database 24. It is appreciated that by computing statistics/metrics on a second-by-second basis, the analytic dashboard running on browser 27 can analyze the results on various levels of granularity. In other words, the user may want to view statistical results of the load test on a minute-by-minute basis, or all the way down to a second-by-second basis. Thus, the architecture described herein allows a user to view real-time streaming results in an analytic dashboard of various performance metrics on a second-by-second basis, even when there are millions of virtual users on thousands of load servers. The GUI described herein also allows a user to combine/correlate test result datasets from two or more charts automatically through a simple drag-and-drop operation.

Note that as the load test progresses, within each load server, a component or client periodically calculates or computes aggregated test results from the raw load test data generated from the target website. The raw data may comprise HTTP, Simple Object Access Protocol (SOAP) or other protocols messages' responses received from the target website, whereas the aggregated test results may comprise any statistic or metric of interest. The periodic interval that the aggregated test results are computed for may vary, but in a specific embodiment, results are computed every second.

The aggregated test results computed by the client running on each load server are periodically sent to their associated analytic server. The period at which the aggregated results are sent to the analytic servers may be equal to or greater than the period at which the aggregated test results are computed within each load server. In a typical implementation, aggregated test result data is computed by each load server every second, with the results of those computations being sent to the analytic servers from each of the load servers every five seconds.

Next, at each analytic server the aggregated test result data received from each of the associated load servers is further aggregated. In other words, each analytic server produces aggregated test result data across all of its associated load servers. For example, if each analytic server is associated (i.e., connected) with 50 load servers, each analytic server aggregates statistics/metrics across the aggregated test result data received from each of the 50 load servers.

Finally, at block 54, the aggregated data produced by each analytic server is further aggregated at the system-wide data store in real-time. For instance, Structured Query Language (SQL) queries to the database can perform aggregation functions (e.g., AVG, SUM, etc.) against tables' rows that have been inserted from the individual analytics servers, thereby producing further (third-level) aggregated results.

As explained above, the results of this final level of aggregation are available in real-time to a browser executing an analytic dashboard that provides a graphical display of the multiple results in various charts. The results are maintained in the dashboard in real time, since the browser continues to produce the latest changes in each result set by querying the database for all of the rows that have changed since the last time that the queries ran.

A "delta-change" document may be produced and sent to the browser, which merges the changes into the currently displayed chart. In one embodiment, if the multi-result chart is combined or correlated, the dashboard may produce more than one delta-change document and merge all of the different changes into the multi-result chart. If the multi-result chart is correlated, the widget code may wait or pause until both data points (from each result set) are available for a given point in time. In other words, a new point is shown in the statistical correlation chart once the data is available for each result set.

Figure 4:
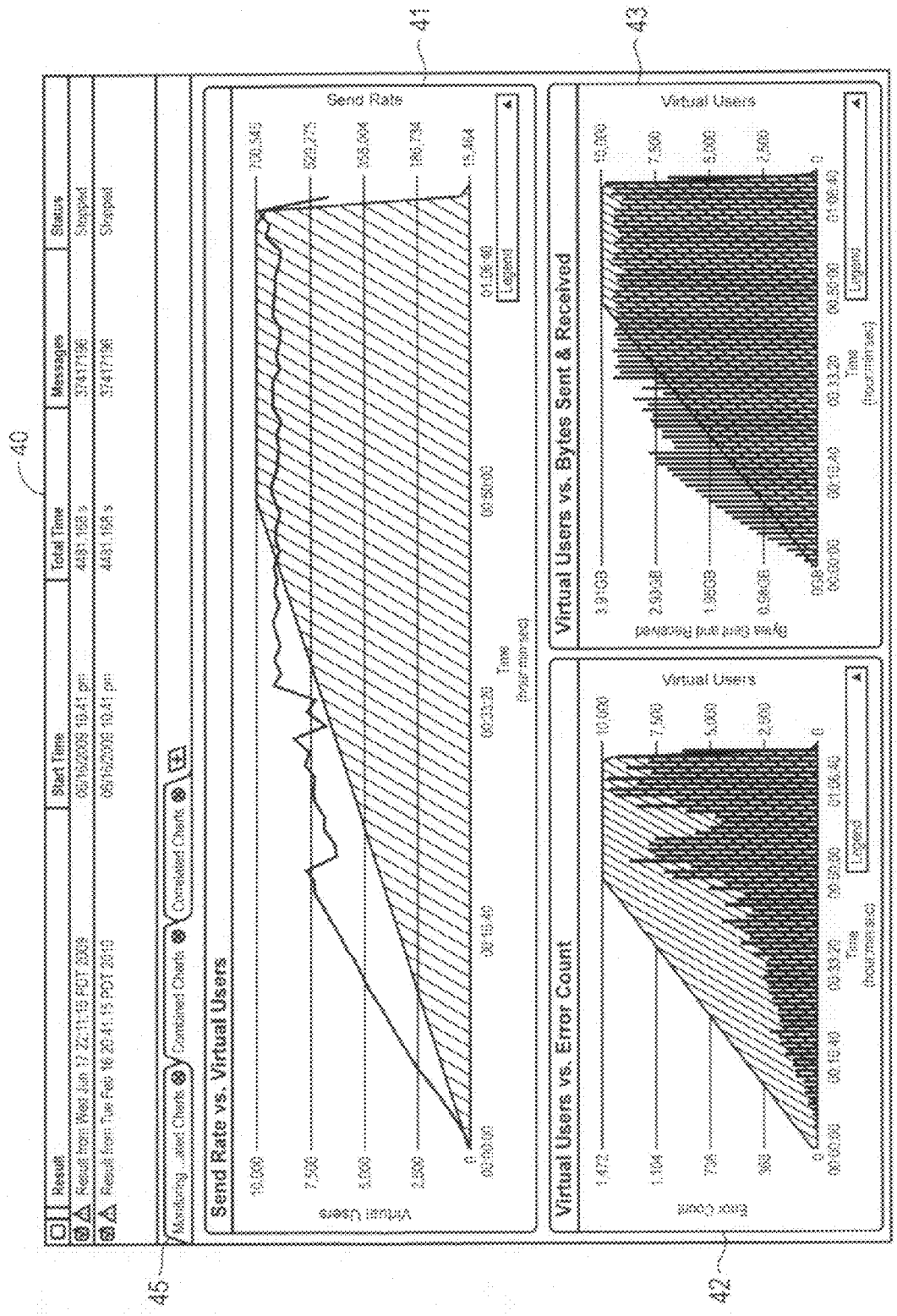
FIG. 4 illustrates an example graphical user interface window that shows real-time results of a test composition running on an example grid.

FIG. 4 illustrates an example graphical user interface window (also referred to as a "dashboard" 40 that shows real-time results of a test composition running on an example grid. As can be seen, a set of combined charts are shown graphically in various window fields, also referred to as "chart widgets". (In the context of the present disclosure, a widget refers to a super class of charts—anything that a user might want to display graphically on a user interface. A widget can be one or more charts, a cross-set of results data, a set of charts, a list of data, or any combination/correlation of data graphically displayed on the analytic dashboard.)

For example, field or widget 41 is an example combined chart that illustrates the number of virtual users (shaded area) and the send rate (heavy line) as a function of test time. Test time is represented along the common x-axis of this combined chart, while the units associated with the virtual users and send rate are shown along the left-side y-axis and right-side y-axis, respectively. By way of example, combined chart 41 may be automatically produced by selecting a chart showing the number of virtual users versus time, dragging it to a position on the display screen over a second chart showing send rate versus time, and dropping the first chart on the second chart.

A wide variety of input commands/devices may be used to effectuate the selection, dragging, and dropping steps. For example, a user may select a chart by clicking-on or holding a button of an input device such as a mouse, then moving the cursor, and then releasing (or clicking again) a button of the input device while the cursor is over the second chart. Alternatively, touch-based input commands, such as "tapping", "swiping", or other finger movements/actions on a touch-screen input device, may be used to combine or correlate charts. Still other input devices and methods may be utilized, including conventional keypad-based input commands, or voice-based input command devices.

In FIG. 4, field 42 illustrates a combined chart showing error count (vertical dark lines) and the number of virtual users (shaded area) versus test time. Field 43 shows the number of bytes sent and received (vertical dark lines) and the number of virtual users (shaded area) as a function of test time. It is appreciated that the user may select/view a wide variety of charts (combined, correlated, etc.) using tabs 45, which allow the user to switch between different dashboards. Collectively, the charts provided in window 40 allow a user to view, analyze, and monitor test results and information in real-time so as to help identify root causes of performance problems their website or web application may be experiencing.

Persons of skill in the arts will appreciate that FIG. 4 shows how the entire test grid (comprising a huge number of interconnected load and result servers) works in concert to send load, receive responses, aggregate and analyze those responses into a real-time streaming graphical result displayed to the user. All this is accomplished regardless of how many server instances and different cloud providers are utilized to run the load test. Moreover, the various result charts may be viewed in one or many real-time streaming analytic dashboards. In each of the charts displayed on analytic dashboard window 40, the user may change the time format or legend of the horizontal axis for reporting the testing analytics in real-time on a varying time (e.g., hour-by-hour, minute-by-minute, or second-by-second) basis.

To combine or correlate two charts a user may locate two widgets (charts) presenting like data on the GUI which provides the analytic dashboard of real-time streaming results. For example, two charts with results data displayed per minute may be located or otherwise identified on the display screen. (In one embodiment, if an edit mode associated with the analytic dashboard is active, it should be toggled to an "off" state prior to combining or correlating charts.) In one embodiment, the user places the mouse cursor over the title bar of the first (source) widget and depresses the left-button (left-click) of the mouse. At that point, a drag icon (e.g., cross-directional arrows) appears on the display screen, indicating that the first widget has been selected. The user then drags the first widget onto a second (target) widget. If the two charts are capable of being combined by the automated program, a drop icon (e.g., downward arrow) appears. If, on the other hand, the two charts cannot be combined, a stop icon (e.g., circle with a line through it) appears. In other embodiments, touch-based, keypad-based, or voice-based input command/device technologies may be utilized, as described above. For instance, using a touch-based input device, the user may touch the source chart, drags it around while keeping his finger pressed down, and then lift his finger up once the source chart is positioned above the target chart on the display screen.

Figure 5:
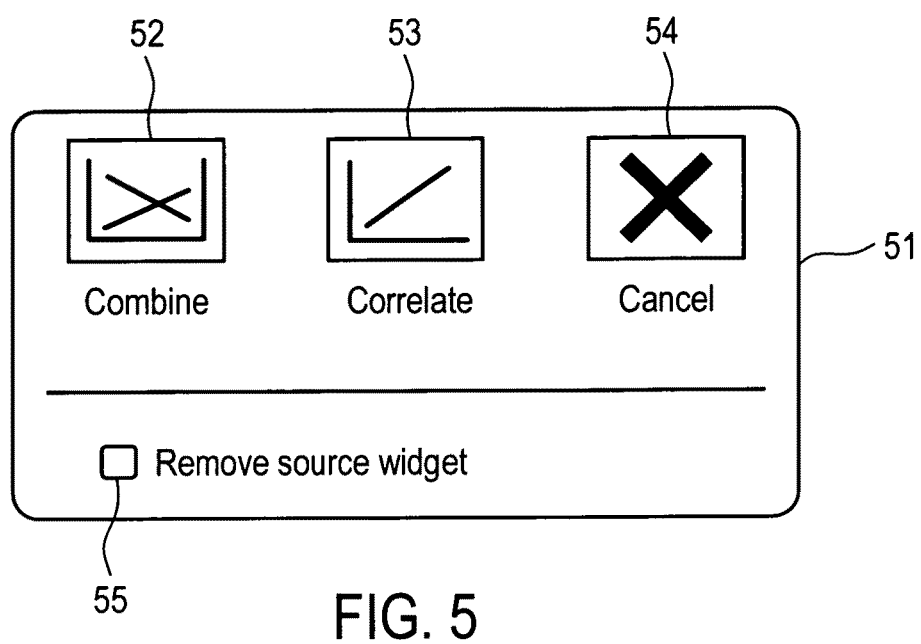
FIG. 5 is an example graphical user interface window showing a menu of options presented to a user for combining or correlating source and target widgets.

In the embodiment described, once a source widget has been successfully dropped onto a target widget, a menu of options appears on the display screen. An example options menu dialogue window 51 is illustrated in FIG. 5. Menu window 51 presents a user with the option to combine or correlate the two widgets by clicking on icons 52 or 53, respectively. A cancel icon 54 is also provided, giving the user the option of abandoning the resulting widget combination.

The user may also click or otherwise select box 55 to remove the source widget selected. In one embodiment, checking box 55 causes the GUI to remove the first widget from the analytic dashboard when the charts are combined.

Settings made to the given widget while combined persist if the widget is detached or removed at a later time.

In one embodiment, the default title for the combined widget is the title of the source widget versus the title of the target widget. For example, the title of a combined widget created via a drag-and-drop process is automatically assigned a new title that reflects the two datasets being displayed. In the event that a combined widget is created, the notation "vs." may be placed between the two original (source and target) widgets' names. If a correlated widget is created, the word "over" may be placed between the two original widgets' names.

Figure 6:
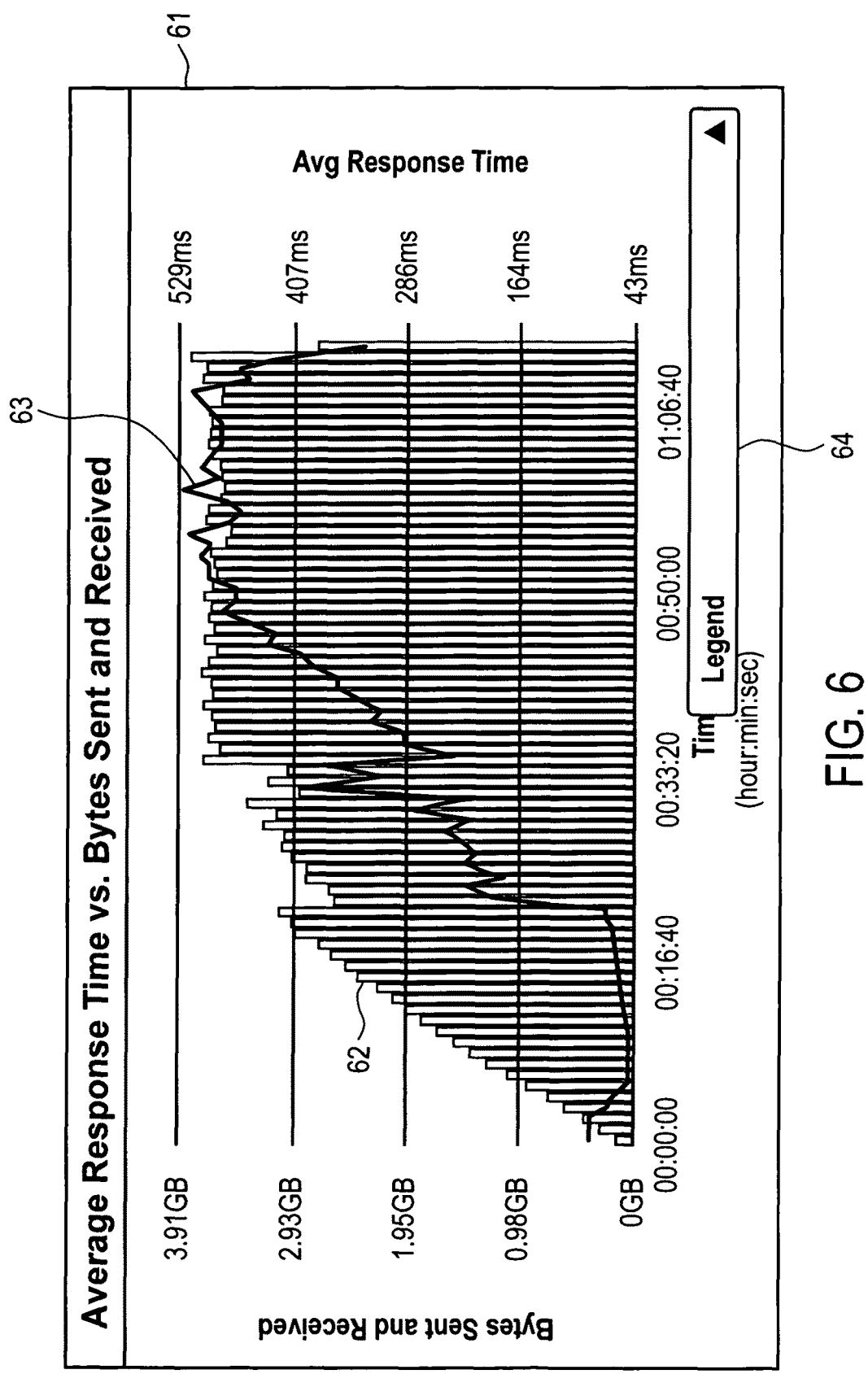
FIG. 6 is an example graphical user interface window that illustrates a combined widget showing average response time versus bytes sent and received.

Thus, in FIG. 6, which illustrates a combined widget 61 showing average response time versus bytes sent and received, the target widget is a chart of average response time versus time, and the source widget is bytes sent and received versus time. Note that in this example the left-side y-axis shows bytes sent and received associated with the source, while the right-side y-axis shows average response time associated with the target. In other words, in the example of FIG. 6, the Bytes Sent and Received chart was dropped onto the Average Response Time chart such that the resulting chart shows the datasets associated with the source and target widgets superimposed upon each other.

Although not explicitly shown, the respective datasets displayed on combined chart or widget 61 may be assigned a distinct color that matches the color of the series name color displayed along the corresponding vertical axis. By way of example, the series name on the left-hand y-axis (Bytes Sent and Received) may be colored yellow to match the histogram data 62 shown, while the legend on the right-hand y-axis (Average Response Time) may be colored red to match the solid bold line 63 shown in widget 61. By clicking on box 64 (labeled "Legend") the user is provided with an option to toggle either chart on/off.

Figure 10:
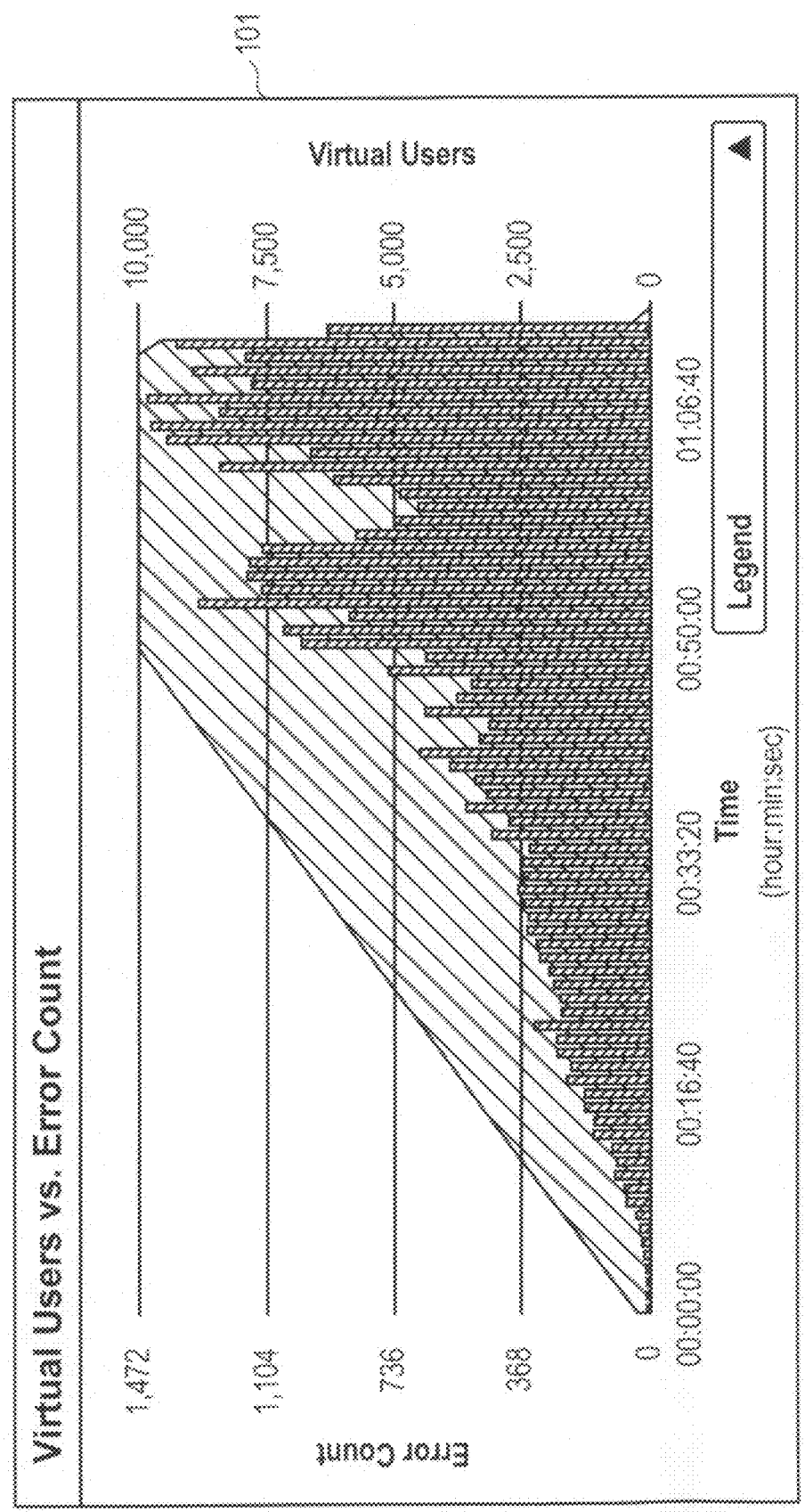
FIG. 10 is an example graphical user interface window that illustrates a combined widget showing the number of virtual users versus error count.
Figure 11:
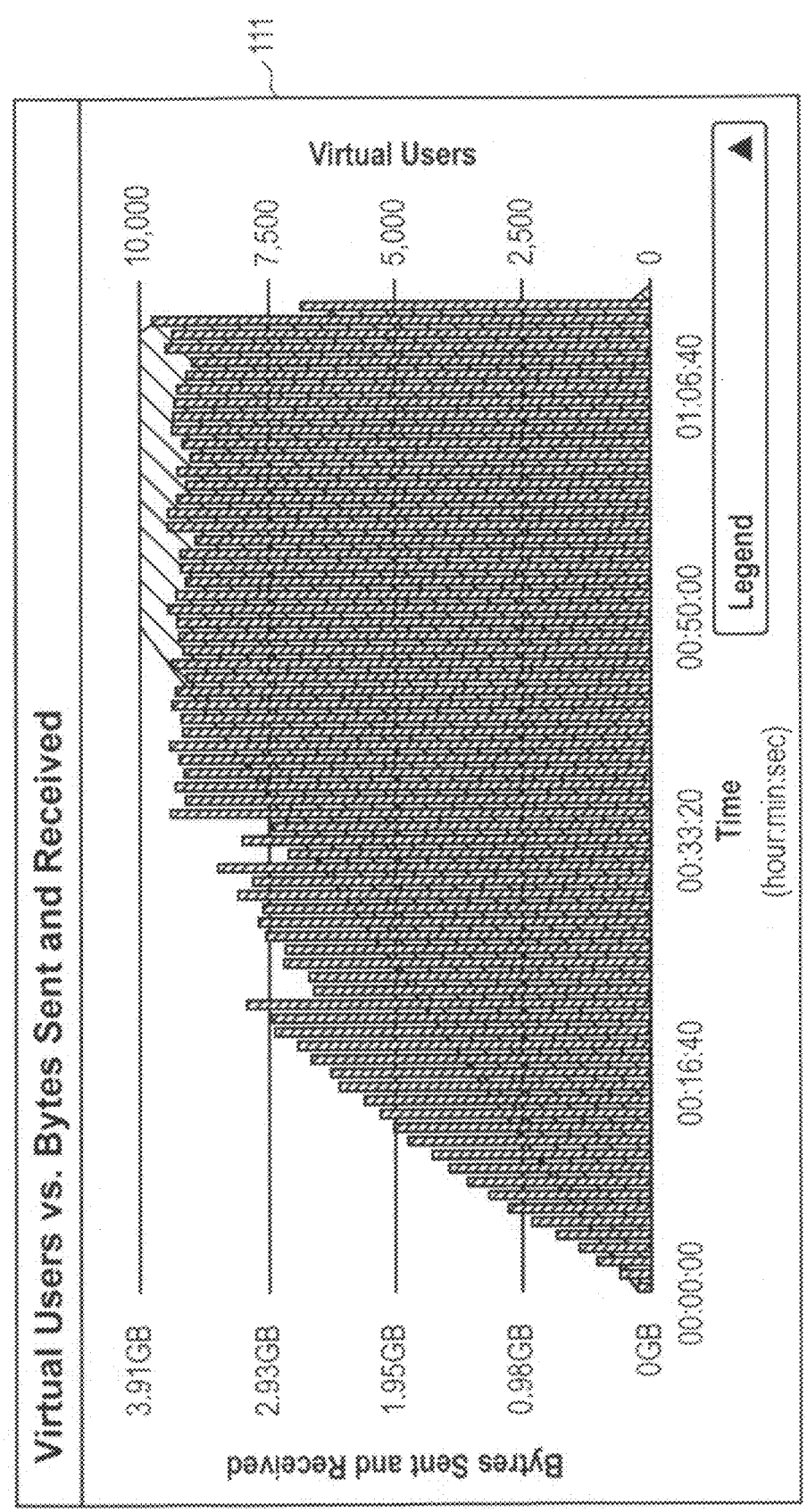
FIG. 11 is an example graphical user interface window that illustrates a combined widget showing the number of virtual users versus bytes sent and received.

It should be understood that a user is not limited to combining just two charts. That is, the GUI described herein allows the user to combine other datasets that are of similar type. For example, in the example of FIG. 6 the source widget showing bytes sent and received may be a combined widget of two charts: one that shows bytes sent and another that shows bytes received. Both of these charts are of similar type (i.e., both are counts of things). In such a case, widget 61 represents the combination of three charts or widgets. In still other embodiments, users are provided with the ability to combine two or more data sets of different types, e.g., producing a results chart having more than one right-hand y-axis, or more than one left hand y-axis, FIGS. 10 and 11 are example dashboard widgets that illustrate additional combined charts that bring together various metrics showing how user load and the overall data exchange between client (virtual users) and server (website application) devices produce bottlenecks at a given test load level. By way of example, FIG. 10 is an example widget 101 that shows how, as the number of customers (Virtual Users) spikes upward at approximately the fifty minute mark of the load test, the Error Count plateaus on the chart, which may indicate an unacceptable error count level. FIG. 11 is an example widget 101 that shows user data and the corresponding server responses charted in the Virtual Users vs. Bytes Sent and Received chart. Persons of skill in the art will appreciate that the graphical information provided in these real-time charts is extremely powerful. By combining/correlating load test metrics such as customers (Virtual Users), their messages (Send Rate), and data by volume (Bytes Sent and Received) as messages/responses compared to one another and contrasted with Error Count, scaling issues on a particular website design can be immediately exposed.

Figure 7:
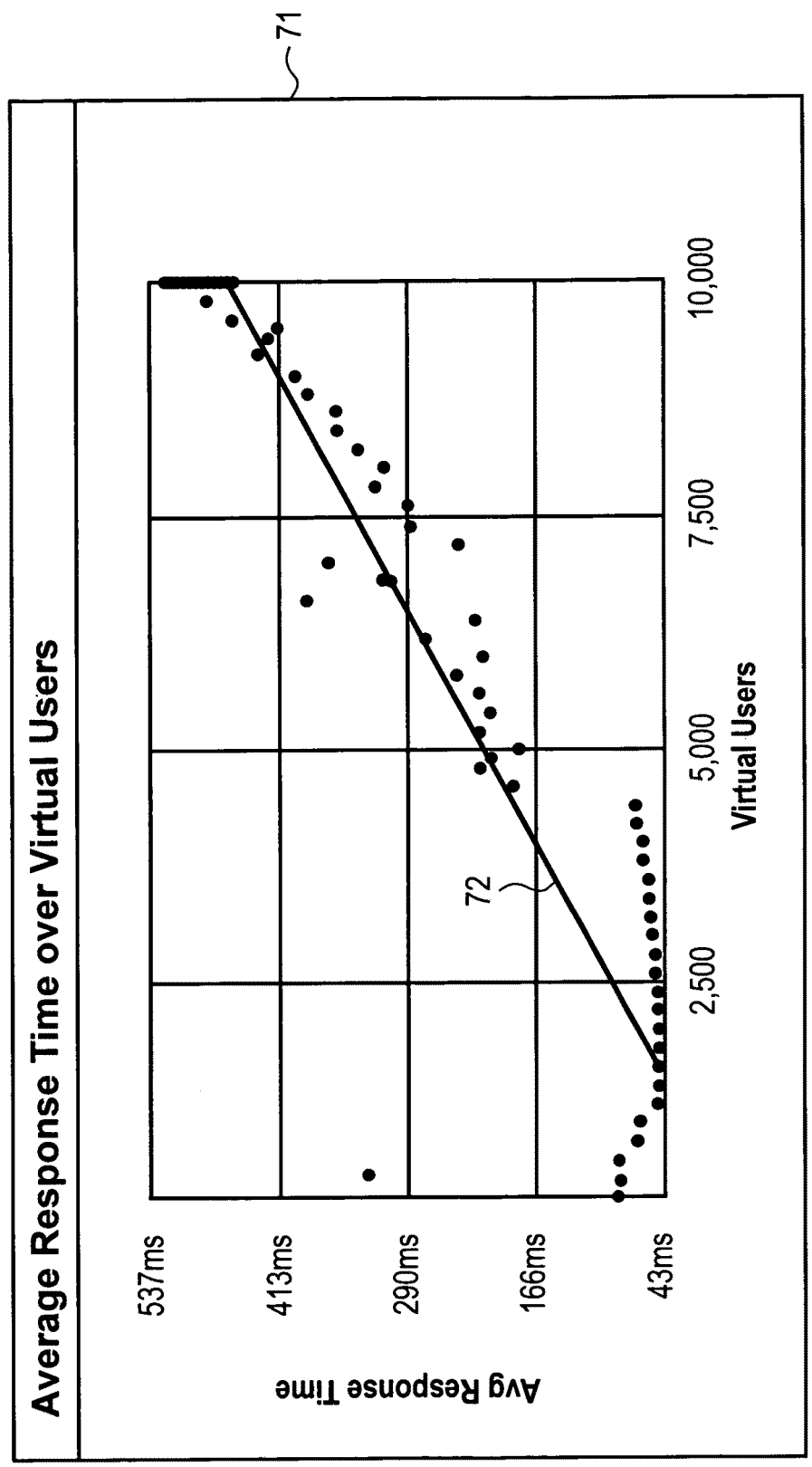
FIG. 7 is an example graphical user interface window that illustrates a statistical correlation between two datasets.

FIG. 7 is an example widget 71 that illustrates a statistical correlation between two datasets sharing a common parameter. In this case, the parameter time is used to join the two datasets. For example, widget 71 may be generated using the GUI described herein by dragging and dropping source and target widgets in the manner described above and then clicking on (or otherwise selecting) correlate icon 53 shown in FIG. 5. As shown, widget 71 is a chart that illustrates how the average response time (which may correspond to the number of errors that occur at the target website) changes as the number of virtual users loading the target website increases. In this example, the GUI described herein allows a user to drag-and-drop an average response time chart onto a virtual user number chart and then select the correlate option from menu window 51 of FIG. 5. In this particular embodiment, a line 72 is produced that represents a linear trend that best fits the plotted points from the two datasets.

Persons of skill in the art will appreciate that the disclosed system and GUI provides a user with the ability to combine disparate chart data provided that each are time-based types. For example, monitor data may be combined with result data. Monitor data may also be combined with other monitor data. In other words, all sorts of different permutations of datasets are supported in the analytic dashboard GUI described herein.

Figure 8:
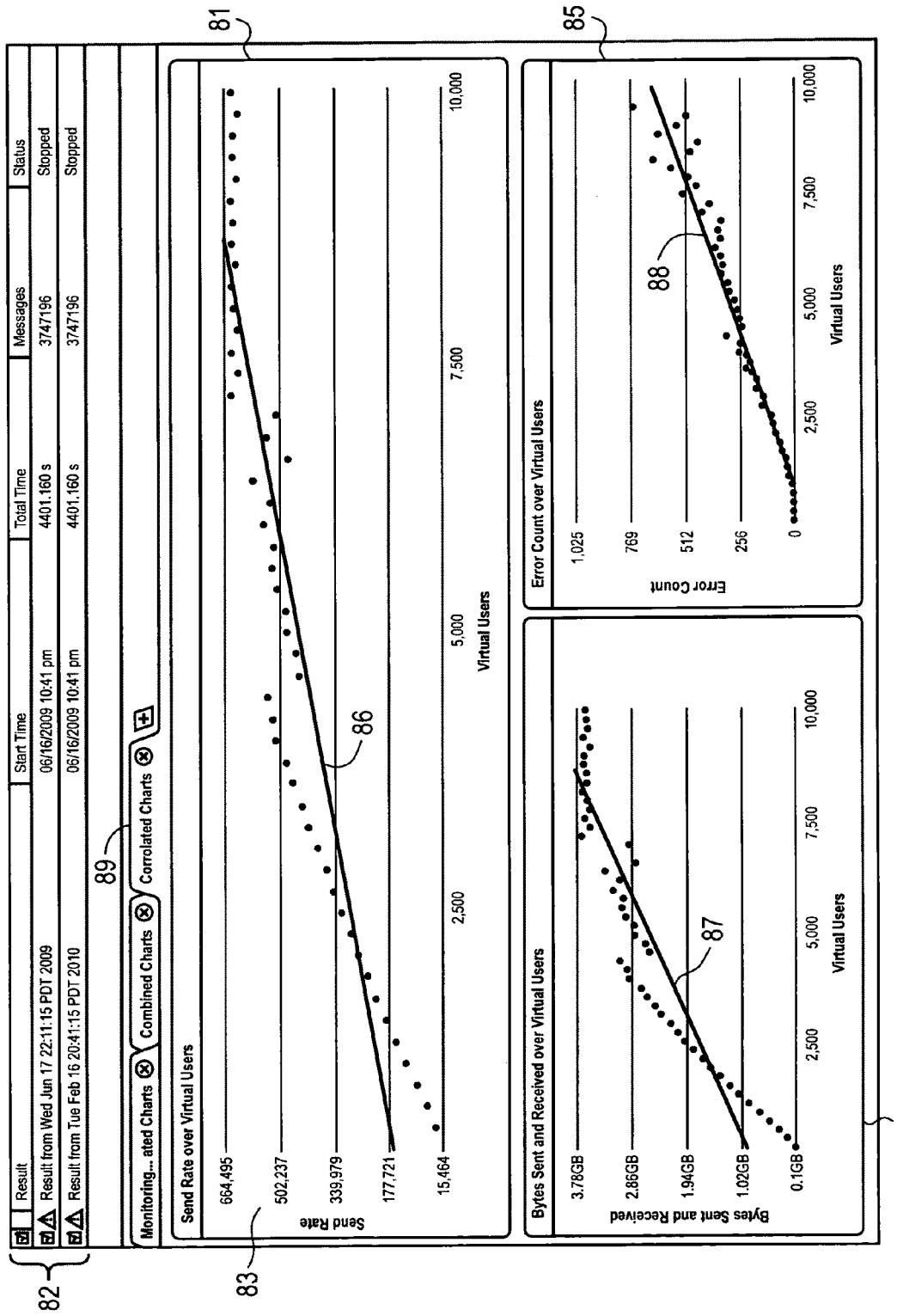
FIG. 8 illustrates an example graphical user interface window that shows statistically correlated charts.

FIG. 8 is an example GUI window 81 that shows a dashboard with a number of correlated charts, which correlate different metrics from a single result, or a single result with a single monitor. As can be seen, three different correlated charts are shown graphically in various window fields in FIG. 8. For example, field 83 is an example correlation chart that illustrates send rate over the number of virtual users loading a target website. Field 84 show a statistical correlation of bytes sent and received over the number of virtual users. Field 85 show a statistical correlation of error count over the number of virtual users for the same results data selected in tab 82. Correlated charts share a common time x-axis that permits the dragged target to be plotted over the drop target. The correlated charts dashboard window 81 presents three such charts using the same four metrics as in the combined charts dashboard shown in FIG. 4: Send Rate over Virtual Users, Bytes Sent and Received over Virtual Users, and Error Count over Virtual Users.

In addition, trend lines 86-88 are shown superimposed on the data points in respective fields 83-85. In one embodiment, trend lines 86-88 are automatically generated by the GUI program. Trend lines 86-88 represent a best-fit line to the resulting data, and may be generated using regression analysis algorithms or tools.

Persons of ordinary skill will further appreciate that the information provided in the dashboard window fields of FIG. 8 gives a user valuable insight into how well the target website is performing. For instance, in this example, send rate, bytes sent and received, and error count are all shown increasing (positively correlated) with the number of virtual users. Thus, the ability to quickly combine and/or correlate results data in a real-time analytic dashboard provides a user with a powerful ad hoc analytical/investigative tool to better understand the performance of a target website. It should be understood that the GUI shown and described herein provides drag-and-drop capabilities in real-time, while the load test is running.

Once a widget displays a single resource set, that data can be combined or correlated with a Monitor widget. In other words, the GUI permits a user to combine or correlate test results with monitors.

Figure 9:
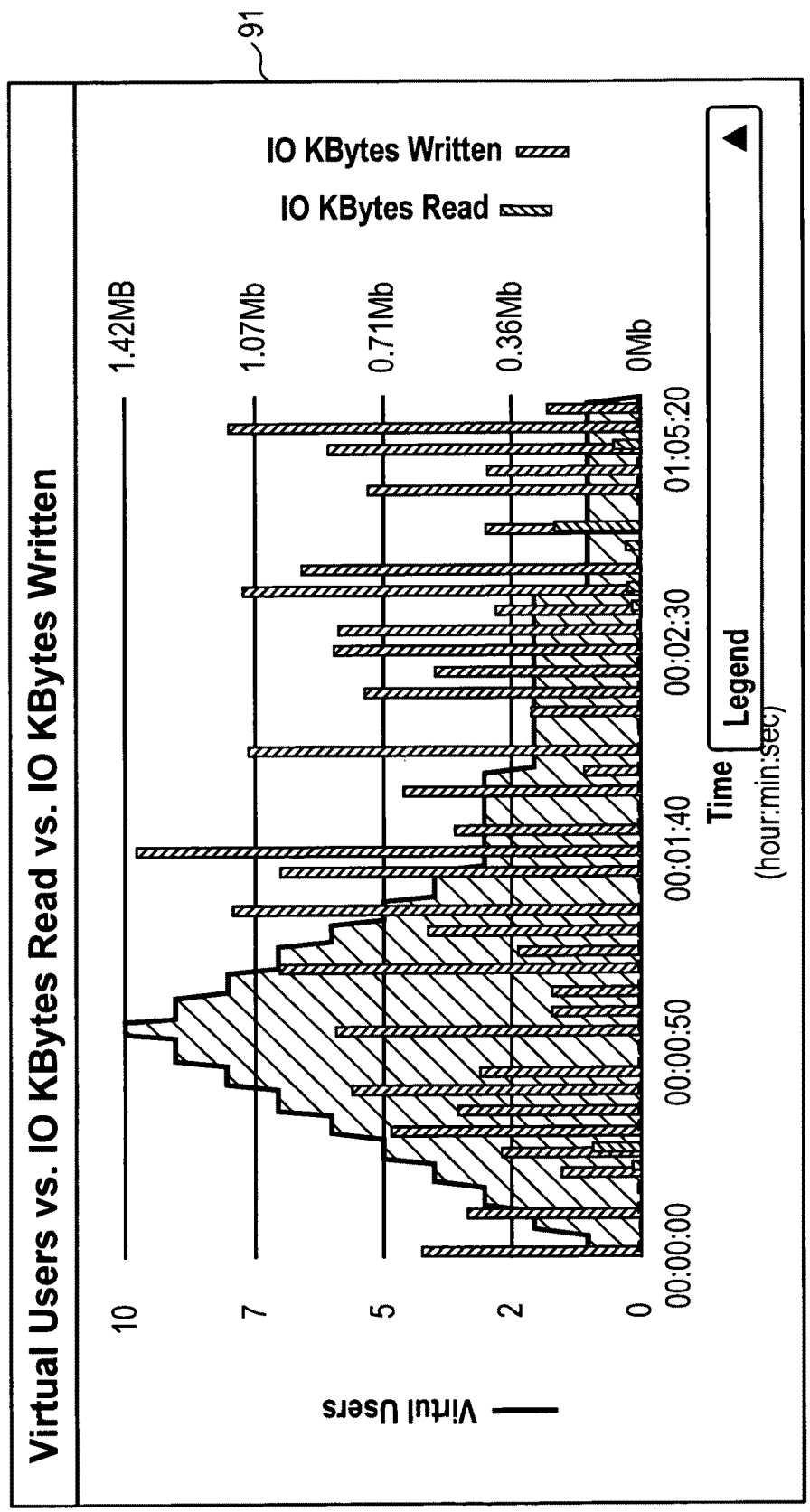
FIG. 9 illustrates an example graphical user interface window that shows a statistical correlation of results' data with monitors' data.

FIG. 9 is an example dashboard window (widget) 91 that graphically charts a statistical correlation of results with monitors. The monitoring combined charts dashboard window allows a user to bring together classic resource monitoring (e.g., CPU usage, IO Kbytes Read/Written, etc.) of hosts and target servers with load-related metrics such as Virtual Users and Send Rate to demonstrate the relationship of front- and back-end metrics together. As shown in this example, widget 91 brings together IO Kbytes Read/Written of hosts and target servers correlated with virtual users. In one embodiment, widget 91 may be produced by first opening the Composition Editor—Results tab and then selecting from the Monitor widget category from the tabs provided above the chart fields (see FIG. 8). One or more result items in the Results list may then be selected by the user. A resource, such as Average Min Max Response Time, is located from the result set to drag. A target monitor widget is then located, e.g., IO Kbytes Read. The user may drag the resource onto the monitor widget and then select "Correlate" from the options menu automatically presented.

It is appreciated that the ability to selectively combine or correlate two or more charts representing different datasets into a single chart (i.e., create a single multi-axis chart from two or more different charts) is not limited with respect to the source of the data. That is, the data sets to be combined or correlated may be internal to a specific data processing system, or from any supported external data source or application. The external data sources, or instance, may define how CloudTest can read data from other applications. In an example implementation, support is provided for CloudTest reading data from a third-party monitoring application solution called CA Wily Introscope®. The available metrics' metadata from the external data source is presented in CloudTest and the GUI allows a user to choose to display it as charts. Those charts' datasets can be combined and correlated with other external data source charts, with CloudTest (internal) results' charts, or with internal monitors' charts.

The GUI described herein also allows a user to correlate monitor data to monitor data that is present on a dashboard, and where the data can be combined or correlated. The sequence of steps for combining or correlating monitor data is similar to that described above. For example, from within a dashboard, a user may locate two monitor widgets, e.g., IO Kbytes Read and IO Kbytes Sent. The mouse cursor is placed over the title bar of the first widget on the display until a Drag icon appears. The user may then drag the first widget onto the second widget until a Drop icon appears. If a Stop icon appears, the two charts cannot be combined. Once the first widget is successfully dropped onto the second widget, the user may select "Correlate" from the options menu. The resulting widget correlating monitor data to monitor data is then automatically created with a default title (e.g., "Widget 1 over Widget 2").

It should be understood that elements of the disclosed subject matter may also be provided as a computer program product which may include a machine-readable medium having stored thereon instructions or code which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machin'e-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method comprising:
providing an analytic dashboard with a graphical user interface (GUI) that outputs aggregated results streaming in real-time of a load test as the load test is being performed on a target website, the aggregated results including statistics which are graphically displayed in a plurality of charts, the statistics being periodically computed, in part, by a plurality of load servers that implement the load test, each load server including an embedded component that periodically computes the statistics from raw data received from the target website, the aggregated results displayed in the charts changing in real-time as the load test progresses;
responsive to a user interface (UI) input on the GUI as the load test progresses, the UI input comprising dragging and dropping a source chart onto a target chart, automatically generating a single chart that represents a statistical correlation of the source and target charts, the single chart having a left y-axis and an x-axis, the statistical correlation of the single chart changing in real-time as the load test progresses; and
producing a graphical representation of the single chart on the analytic dashboard, the single chart changing in real-time as the load test progresses.

2. The computer-implemented method of claim 1 wherein the UI input further comprises selection of the statistical correlation from a menu presented via the GUI.

3. The computer-implemented method of claim 1 further comprising responsive to additional drag and drop UI input automatically generating a new single chart that combines the single chart with another chart, the new source chart having a y-axis that matches, in unit-type, either the left y-axis or the right y-axis of the single chart, the new single chart changing in real-time as the load test progresses.

4. The computer-implemented method of claim 1 further comprising, for the statistical correlation, matching each data point from the source and target charts based on a common x-axis unit-type.

5. The computer-implemented method of claim 4 wherein the common x-axis unit-type is time.

6. The computer-implemented method of claim 4 wherein the left y-axis associated with the source chart and the x-axis is associated with the target chart.

7. The computer-implemented method of claim 1 wherein the analytic dashboard is provided by a browser application.

8. The computer-implemented method of claim 1 wherein the UI input comprises a touch-based command.

9. A non-transitory computer-readable storage medium encoded with a computer program, when executed the computer program being operable to:
provide an analytic dashboard with a graphical user interface (GUI) that outputs aggregated results streaming in real-time of a load test as the load test is being performed on a target website, the aggregated results including statistics which are graphically displayed in a plurality of charts, the statistics being periodically computed, in part, by a plurality of load servers that implement the load test, each load server including an embedded component that periodically computes the statistics from raw data received from the target website, the aggregated results displayed in the charts changing in real-time as the load test progresses;

responsive to user interface (UI) input comprising dragging and dropping a source chart onto a target chart on the GUI as the load test progresses, automatically generate a single chart that represents a statistical correlation of the source and target charts, the single chart having a left y-axis and an x-axis, the statistical correlation of the single chart changing in time as the load test progresses; and produce a graphical representation of the single chart on the analytic dashboard, the single chart changing in real-time as the load test progresses.

10. The non-transitory computer-readable storage medium of claim 9 wherein the computer program, when executed, is further operable to automatically generate, responsive to additional drag and drop UI input, a new single chart that combines the single chart with another chart, the new source chart having a y-axis that matches, in unit-type, either the left y-axis or the right y-axis of the single chart, the new single chart changing in real-time as the load test progresses.

11. The non-transitory computer-readable storage medium of claim 9 wherein the computer program product, when executed, is further operable to match, for the statistical correlation, each data point from the source and target charts based on a common x-axis unit-type.

12. The non-transitory computer-readable storage medium of claim 11 wherein the common x-axis unit-type is time.

13. The non-transitory computer-readable storage medium of 9 wherein the UI input further comprises selection of the statistical correlation from a menu presented via the GUI.

14. The non-transitory computer-readable storage medium of claim 9 wherein the UI input comprises a touch-based command signal.

15. An apparatus comprising:
a display; and
a program that runs on a computer to produce a graphical user interface (GUI) on the display, the GUI providing an analytic dashboard that outputs aggregated results on the display steaming in real-time of a load test as the load test is being performed on a target website, the aggregated results including statistics periodically computed by a plurality of load servers that implement the load test, each load server including an embedded component that periodically computes the statistics from raw data received from the target website, the GUI allowing a user to generate user interface (UI) input comprising dragging and dropping a source chart onto a target chart as the load test progresses, responsive to the UI input the program: (a) automatically generating a single chart that represents a statistical correlation of the source and target charts, the single chart having a left y-axis and an x-axis, the single chart changing in real-time as the load test progresses, and (b) producing a visual representation of the single chart on the analytic dashboard, the visualization changing in real-time as the load test progresses.

16. The apparatus of claim 15 wherein the UI input further comprises selection of the statistical correlation from a menu presented via the GUI.

17. The apparatus of claim 15 wherein the program, responsive to additional UI input, automatically generates a new single chart that combines the single chart with another chart, the new source chart having a y-axis that matches, in unit-type, either the left y-axis or the right y-axis of t he single chart, the new single chart changing in real-time as the load test progresses.

18. The apparatus of claim 15 further comprising, for the statistical correlation, matching each data point from the source and target charts based on a common x-axis unit-type.

19. The apparatus of claim 18 wherein the common x-axis unit-type is time.

20. The apparatus of claim 18 wherein the left y-axis is associated with the source chart and the x-axis is associated with the target chart.

21. The apparatus of claim 15 wherein delta changes in the source and target charts are streamed into the single chart.

22. The apparatus of claim 15 wherein the source chart is provided from an external data source.

23. The apparatus of claim 15 wherein the input comprises a touch-based command.

* * * * *